US012496790B2

(12) United States Patent
Neal et al.

(10) Patent No.: US 12,496,790 B2
(45) Date of Patent: Dec. 16, 2025

(54) CUSTOMIZED MANUFACTURE OF MOLDS FOR MAKING WAVEFRONT-CUSTOMIZED CONTACT LENS USING A WAVEFRONT ABERROMETER

(71) Applicant: Wavefront Dynamics, Inc., Albuquerque, NM (US)

(72) Inventors: Daniel R. Neal, Albuquerque, NM (US); Jeff Kolberg, Laguna Beach, CA (US); Jason Marsack, Houston, TX (US); Raymond Alan Applegate, Kingwood, TX (US)

(73) Assignee: Wavefront Dynamnics Inc., Albuquerque, NM (US)

( * ) Notice: Subject to any disclaimer, the term of this patent is extended or adjusted under 35 U.S.C. 154(b) by 208 days.

(21) Appl. No.: 18/328,312

(22) Filed: Jun. 2, 2023

(65) Prior Publication Data
US 2023/0391029 A1    Dec. 7, 2023

Related U.S. Application Data

(60) Provisional application No. 63/348,627, filed on Jun. 3, 2022.

(51) Int. Cl.
*B29D 11/00* (2006.01)
*B29C 33/38* (2006.01)
(Continued)

(52) U.S. Cl.
CPC .... *B29D 11/00086* (2013.01); *B29C 33/3835* (2013.01); *B29C 39/22* (2013.01);
(Continued)

(58) Field of Classification Search
CPC ........ B29D 11/00086; B29D 11/00038; B29D 11/0048; B29D 11/00932;
(Continued)

(56) References Cited

U.S. PATENT DOCUMENTS 5,658,602 A    8/1997  Martin et al.
5,922,249 A    7/1999  Ajello et al.
(Continued)

*Primary Examiner* — Nahida Sultana
(74) *Attorney, Agent, or Firm* — Quinn IP Law

(57) ABSTRACT

Systems and methods for manufacturing a wavefront-customized contact lens. The systems include: (1) an optical instrument for measuring ocular imperfections of a patient's eye; (2) a computer for designing a mold and pin design used for manufacturing a wavefront-customized contact lens that corrects the ocular imperfections; (3) a fabrication machine for fabricating a wavefront-customized mold that includes corrections for the ocular imperfections; and (4) a manufacturing equipment for manufacturing a wavefront-customized contact lenses that uses the wavefront-customized mold; wherein the wavefront-customized mold design and wavefront-guided contact lens manufacturing are uniquely customized for each patient's eye. The optical means can be a wavefront aberrometer with, or without, a profilometer and/or an Optical Coherence Tomography (OCT) module. The wavefront-customized contact lens can be a soft contact lens or a rigid, gas permeable contact lens.

5 Claims, 6 Drawing Sheets

(51) Int. Cl.
*B29C 39/22* (2006.01)
*B29C 45/26* (2006.01)
*B29C 64/10* (2017.01)
*B33Y 10/00* (2015.01)
*B33Y 80/00* (2015.01)

(52) U.S. Cl.
CPC .............. *B29C 45/26* (2013.01); *B29C 64/10* (2017.08); *B33Y 10/00* (2014.12); *B33Y 80/00* (2014.12)

(58) Field of Classification Search
CPC .......... B29D 11/00961; B29C 33/3835; B29C 39/22; B29C 45/26; B29C 64/10; B33Y 10/00; B33Y 80/00
See application file for complete search history.

(56) References Cited

U.S. PATENT DOCUMENTS

| | | | |
|---|---|---|---|
| 6,071,111 A | 6/2000 | Doke et al. | |
| 6,086,204 A | 7/2000 | Magnante | |
| 6,095,651 A | 8/2000 | Williams et al. | |
| 6,158,861 A | 12/2000 | Oyama et al. | |
| 6,379,008 B1 | 4/2002 | Chateau et al. | |
| 6,499,843 B1 | 12/2002 | Cox et al. | |
| 6,511,180 B2 | 1/2003 | Guirao et al. | |
| 6,550,917 B1 | 4/2003 | Neal et al. | |
| 6,554,425 B1 | 4/2003 | Roffman et al. | |
| 6,655,803 B1 | 12/2003 | Rubinstein et al. | |
| 6,977,051 B2 | 12/2005 | Pegram et al. | |
| 6,997,428 B1 | 2/2006 | Andino et al. | |
| 7,008,570 B2 | 3/2006 | Pegram et al. | |
| 7,530,691 B1 | 5/2009 | Davis et al. | |
| 7,731,873 B2 | 6/2010 | Darnton et al. | |
| 8,923,578 B2 | 12/2014 | Kern et al. | |
| 9,022,570 B2 | 5/2015 | Applegate et al. | |
| 9,551,885 B2 | 1/2017 | Sindt et al. | |
| 9,554,889 B2* | 1/2017 | Johns | B29D 11/00105 |
| 9,658,470 B2* | 5/2017 | Applegate | G02C 7/027 |
| 9,764,501 B2 | 9/2017 | Gibson et al. | |
| 10,534,197 B2 | 1/2020 | Sindt et al. | |
| 10,591,748 B2 | 3/2020 | Sindt et al. | |
| 10,786,959 B2 | 9/2020 | Damodharan et al. | |
| 10,795,182 B2 | 10/2020 | Sindt et al. | |
| 10,852,564 B2 | 12/2020 | Sindt et al. | |
| 10,928,653 B2 | 2/2021 | Sindt et al. | |
| 2014/0192327 A1 | 7/2014 | Sindt et al. | |
| 2014/0227437 A1* | 8/2014 | DeBoer | B29D 11/00009 427/162 |
| 2017/0082869 A1 | 3/2017 | Sindt et al. | |
| 2018/0107021 A1* | 4/2018 | Bishop | B33Y 80/00 |
| 2019/0004332 A1 | 1/2019 | Sindt et al. | |
| 2019/0004333 A1 | 1/2019 | Sindt et al. | |
| 2019/0155052 A1 | 5/2019 | Sindt et al. | |
| 2019/0155053 A1 | 5/2019 | Sindt et al. | |

\* cited by examiner

CUSTOMIZED MANUFACTURE OF MOLDS FOR MAKING WAVEFRONT-CUSTOMIZED CONTACT LENS USING A WAVEFRONT ABERROMETER

CROSS-REFERENCE TO RELATED APPLICATIONS

This application claims the benefit of Provisional patent application Ser. No. 63/348,627 filed Jun. 3, 2022, which is incorporated herein by reference in its entirety.

BACKGROUND

Soft contact lenses are produced in large quantities using several methods of manufacture, one of which is cast molding. Cast or injection molding a soft contact lens is comprised of a series of steps that leads to two opposing surfaces: the contact lens' front surface and the other being the contact lens' back surface, being separated by a center thickness and otherwise being in close proximity to one another. There are several technical ways to make contact lenses using these methods. The space between the front mold and the back mold (i.e. "pin") is then filled with a liquid contact lens material, which is then cured, forming a solid contact lens. See, for example, U.S. Pat. Nos. 5,658,602, 5,922,249, 6,071,111, 6,158,861, 6,997,428, 6,977,051, 7,008,570B2, 7,731,873, 9,764,501, and 10,786,959. All patents, published patent applications, and all other references listed herein are hereby incorporated by reference in their entirety.

The surfaces used to define the front and back of the contact lens are commonly referred to as a front mold and a back pin structure, or generically as "molds". When the front mold and the back pin are combined, the final soft contact lens shape has at least two properties: 1) it exhibits specific macro properties, such as diameter, base curve, transition zones, and ballasting, and 2) the anterior surface curvatures, posterior surface curvatures, and central lens' thickness impart a desired optical power (which can be spherical or sphero-cylindrical). In clinical practice, the clinician applies a lens and judges the fit and optical performance of the lens. The clinician chooses from a series of soft lens optical powers to obtain an appropriate refractive correction for a given eye.

Currently, any brand of molded soft lenses comes in a discrete set of optical powers of sphere, cylinder, and axis (perhaps around 1000 or so possible combinations are offered). This is a very limited set of optical powers, but it does allow manufacturers to define a discrete number of mold surfaces, and manufacture thousands of lenses of a particular macro properties and power from a single set of front and back molds. However, this discretizing of the correction ensures all eyes that wear soft contact lenses will have uncorrected sphere and cylinder error.

Eyes also exhibit higher order aberrations (aberrations beyond sphere and cylinder) that limits visual image quality and visual performance for many eyes. Historically, these residual sphere and cylinder, as well as higher order aberrations, are ignored in molded soft lenses. That said, there is nothing inherent in the manufacturing process that prohibits molds from including these patient-specific levels of aberration compensation, designed to further improve visual image quality and performance.

Medicine is becoming increasingly individualized, with ophthalmic care often leading the field. Thus, there is a growing number of US patents related to using wavefront correction (i.e., abberometry) to create customized contact lenses (U.S. Pat. Nos. 7,530,691, 6,086,204, 6,095,651, 6,379,008, 6,499,843, 6,511,180, 6,550,917, 06,554,425, 6,655,803, 7,530,691, 9,022,570, 9,554,889, and 9,658,470). However, molded contact lenses are generally limited to discrete steps or SKUs. Fully customized contact lenses can be manufactured with a computer-controlled lathe, either as a rigid lens or from a material that is rigid during the lathing process but can then be hydrated to make a soft contact lens. While this is a feasible method for making customized or wavefront-guided (wavefront-corrected) contact lenses, it requires using a diamond-tipped lathe to make each individual lens.

Lathing each lens constrains the number of lenses that can be made for a given patient or eye and practically precludes the manufacture of daily wear lenses due the excessive cost of manufacture. While there have been methods developed for making adaptive molds (e.g., U.S. Pat. No. 6,830,712), these require expensive, specialty tooling and have limited applicability in practice. Sindt, et al. describe methods for taking an impression of a patient's eye using a moldable impression material to create an individualized mold (see U.S. Pat. Nos. 10,852,564; 10,795,182; 10,591,748; 10,534,197; 9,551,885; 8,923,578; 2019/0155053; 2019/0155052; 2019/0004333; 2019/0004332; 2017/0082869; 2014/0192327). Note that Ocular Coherence Tomography (OCT) can alternatively be used in place of moldable impressions to measure the physical topography of an eye. Such information is useful in the fitting of the trial contact lens, for good health and stability.

The methods described herein relates to customization of molds to meet the individual optical needs of the patient. It can be applied to any manufacturer's contact lens that is cast or injection molded.

SUMMARY

The present disclosure presents a system and methods for manufacturing a wavefront-customized contact lens. In some embodiments, the system includes: an optical instrument that measures one or more ocular imperfections of a patient's eye; a computer that designs a mold that is used for manufacturing a wavefront-customized contact lens that corrects the one or more ocular imperfections; a fabricating machine that manufactures a wavefront-customized mold that includes corrections for the one or more ocular imperfections; and a manufacturing machine that manufactures a wavefront-customized contact lenses that uses the wavefront-customized mold; wherein the wavefront-customized mold design and the wavefront-guided contact lens manufacturing are uniquely customized for an individual patient's eye. In some embodiments, the optical instrument may be a wavefront aberrometer with, or without, a profilometer and/or an Optical Coherence Tomography (OCT) module. The wavefront-customized contact lens may be a soft contact lens or a rigid, gas permeable contact lens.

In some embodiments, the wavefront-customization system utilizes one or more structural features of the eye chosen from: a shape of the patient's cornea, sclera, a central curvature, or asphericity of the cornea, and combinations thereof.

In some embodiments, the optical instrument comprises a wavefront aberrometer.

In some embodiments, the wavefront aberrometer comprises a Shack-Hartmann wavefront sensor.

In some embodiments, the system is configured to measure a shape of a patient's cornea and sclera to customize a back curve of the wavefront-customized contact lens.

In some embodiments, the system is configured to make an impression of the patient's eye to measure a shape of a patient's cornea and sclera.

In some embodiments, the system is configured to measure the shape of the patient's cornea and sclera by using profilometry or Optical Coherence Tomography (OCT), or combinations thereof.

In some embodiments, the wavefront-customized contact lens comprises a wavefront-customized soft contact lens.

In some embodiments, the wavefront-customized contact lens comprises a rigid, gas permeable contact lens.

In some embodiments, a method for manufacturing a customized contact lens includes:
(1) measuring one or more ocular imperfections of a patient's eye with a wavefront aberrometer;
(2) designing a wavefront-customized contact lens comprising a wavefront-guided front surface profile that corrects the one or more ocular imperfections;
(3) fabricating a wavefront-customized mold that includes the wavefront-guided front surface thickness profile; and
(4) manufacturing one or more wavefront-customized contact lenses via casting or injection molding using the customized mold;
wherein the wavefront-customized mold design and wavefront-customized contact lens manufacture are uniquely customized for the patient's eye.

In some embodiments, a method for manufacturing a wavefront-customized contact lens includes:
(1) identifying an off-the-shelf trial contact lens;
(2) determining if the trial contact lens is suitable for use;
(3) measuring ocular aberrations through the trial contact lens with a wavefront aberrometer;
(4) designing a wavefront-customized correction thickness profile;
(5) integrating the wavefront-customized correction thickness profile into a trial lens profile;
(6) fabricating a wavefront-customized mold; and
(7) manufacturing a wavefront-customized contact lens using the wavefront-customized mold.

In some embodiments, a method for manufacturing a customized contact lens includes:
(1) identifying a trial contact lens and fitting the trial contact lens on an eye;
(2) determining if the trial lens is rotationally and translationally stable enough before proceeding to step (3);
(3) measuring residual uncorrected sphere, cylinder, and higher order aberrations through the trial lens fitted on the eye using a wavefront sensor in a wavefront aberrometer;
(4) designing a wavefront-customized front surface profile that corrects the ocular aberrations measured in step (3);
(5) integrating the wavefront-customized front surface profile from step (4) into a surface definition of the trial contact lens;
(6) manufacturing a wavefront-customized mold based on the wavefront-customized front surface profile from step (5); and
(7) using the wavefront-customized mold from step (6) to make a wavefront-customized soft contact lens.

In some embodiments, step (4) further comprises designing a wavefront-customized rear surface profile.

In some embodiments, a method for manufacturing a customized contact lens includes:

(1) making dynamic eye measurement with a wavefront aberrometer, while wearing an off-the-shelf trial contact lens;
(2) identifying pupil center and radius;
(3) identifying iris center and radius;
(4) identifying trial contact lens center, radius, offset, and rotation angle;
(5) determining optimal pupil size;
(6) Performing Modal and Zonal analysis and generating Zernike polynomials;
(7) filtering out outliers and blinks;
(8) generating wavefront-guided thickness correction map;
(9) converting the wavefront-guided thickness correction map to a contact lens thickness profile; and
(10) positioning the wavefront-guided thickness profile at the identified offset and rotation angle, and
(11) making a wavefront-customized contact lens.

In some embodiments, the method includes fabricating a wavefront-customized mold by using a diamond turned lathe.

In some embodiments, the wavefront-customized contact lens has a front surface and an opposing back surface; wherein the back surface is molded using casting or injection molding; and wherein the front surface is turned on a diamond-tipped, computer-controlled lathe with fast Z-axis capability, or through 3D printing.

In some embodiments, a wavefront-customized mold for making a wavefront-customized contact lens includes a wavefront-customized front mold comprising a support ring with an attached, wavefront-customized interior shape that defines and molds an anterior surface of a wavefront-customized contact lens.

In some embodiments, a customized pin for making a wavefront-customized contact lens, including a customized back pin including a support ring with an attached customized exterior shape that defines and molds a posterior surface of a wavefront-customized contact lens.

BRIEF DESCRIPTIONS OF THE DRAWINGS

DETAILED DESCRIPTION

"Residual aberrations" are those aberrations that are left after some attempt has been made to correct them. In the case of the trial lens, we measure through a trial contact lens that has corrections for the patient's lower order aberrations (general sphere or cylinder, or both). This then provides the residual aberrations that we can use to accurately design the customized contact lens. The words "custom contact lens", "customized contact lens", and "wavefront-customized contact lens" all mean the same thing.

Figure 1:
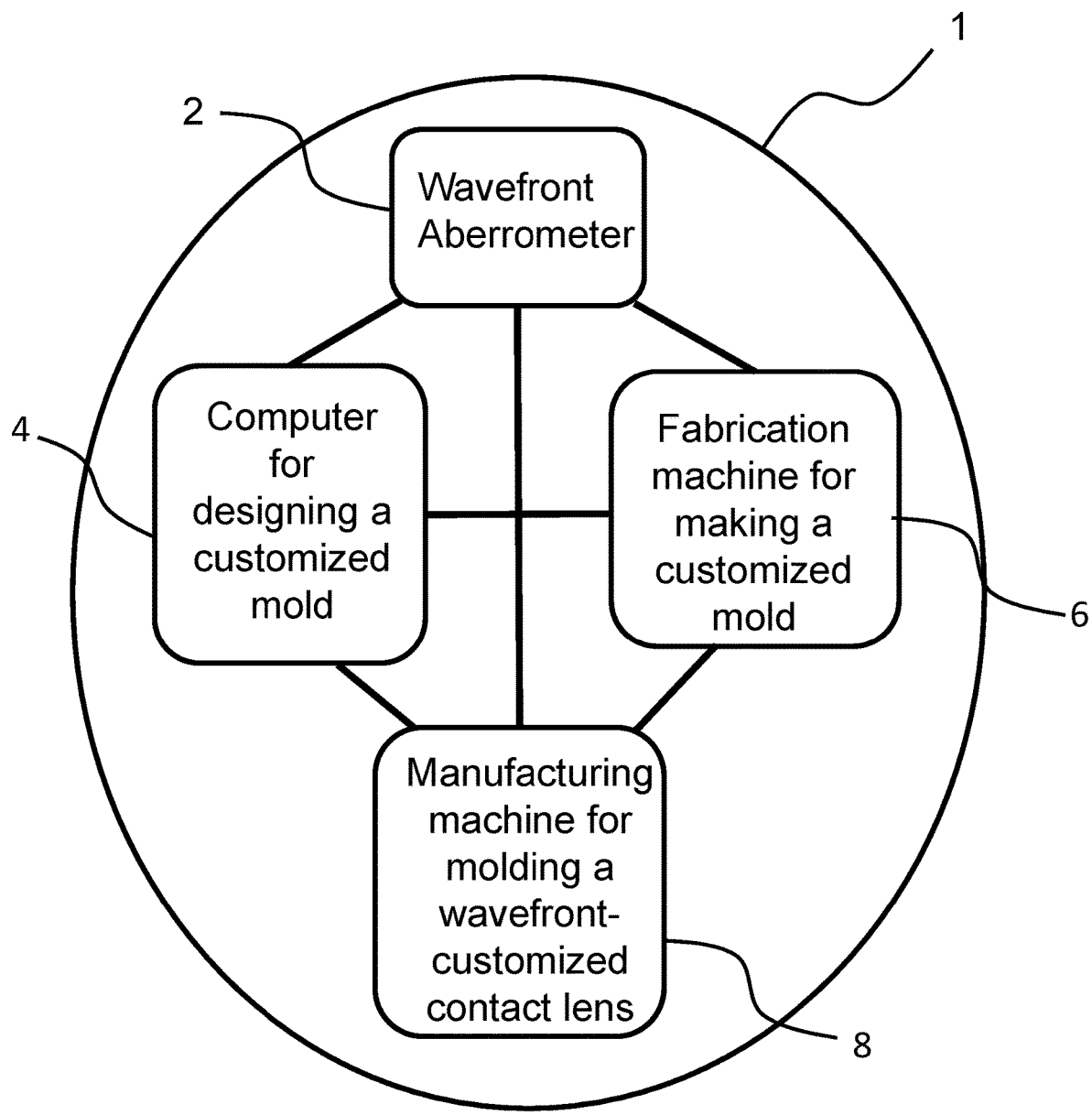
FIG. 1 shows a schematic block diagram of a first embodiment of a system for customized manufacture of molds for making wavefront-customized contact lens using a wavefront aberrometer, according to the present disclosure.

FIG. 1 shows a schematic block diagram of a first embodiment of a manufacturing system 1 for manufacturing wavefront-customized molds that are used for making wavefront-customized contact lens using a wavefront aberrometer, according to the present disclosure. Manufacturing system 1 comprises four components: a wavefront aberrometer 2; a computer for designing a wavefront-customized mold 4; a fabrication machine for making a wavefront-customized mold 6; and a manufacturing machine 8 for molding a wavefront-customized contact lens.

Figure 2:
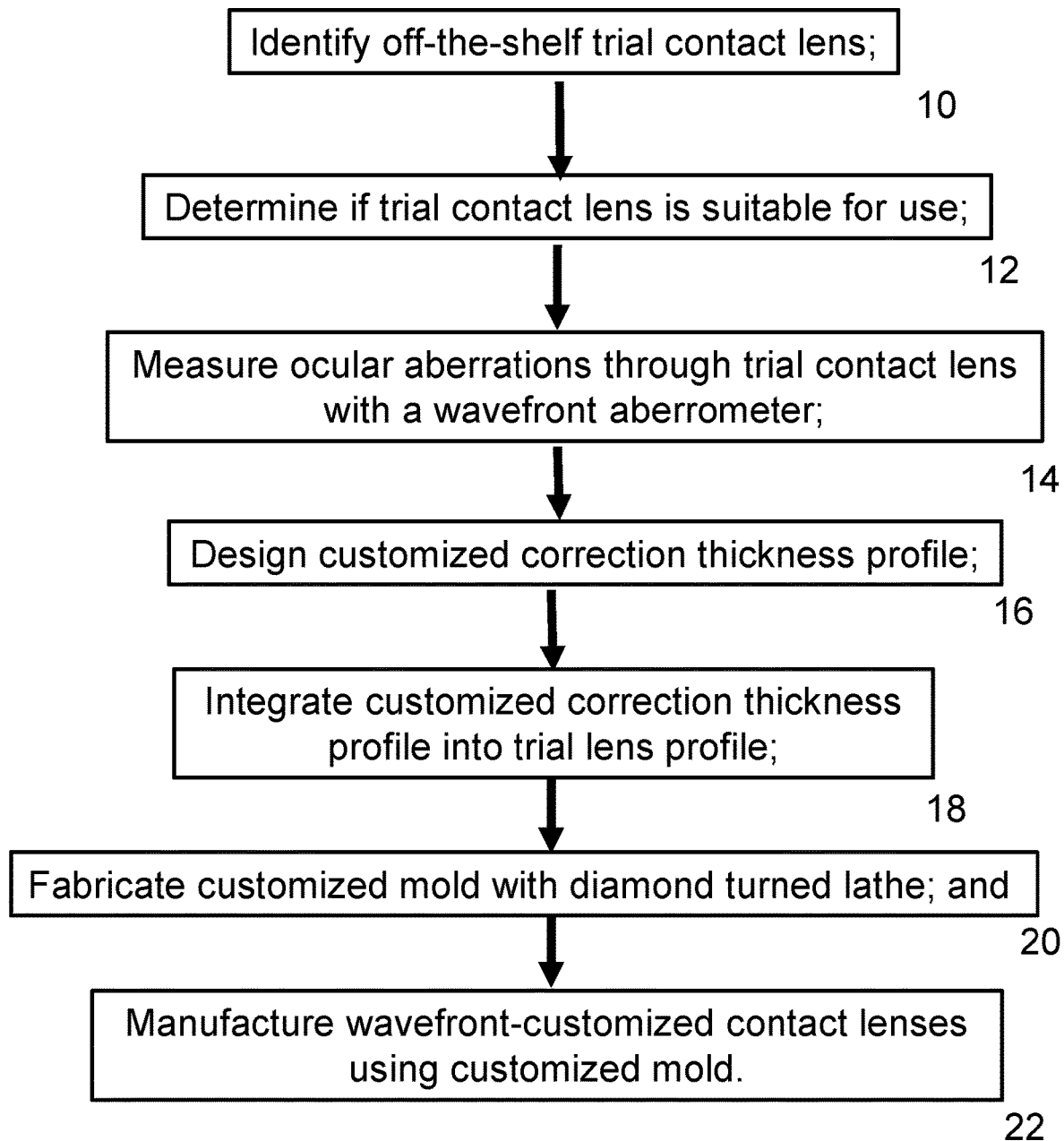
FIG. 2 shows a second embodiment illustrating an example of a process flow chart for using a customized mold in a soft contact lens molding process to make a wavefront-customized soft contact lens, according to the present disclosure.

FIG. 2 shows a second embodiment illustrating a method of manufacturing a wavefront-customized soft contact lens, comprising performing the following steps:
  Step 10: identifying a soft contact lens from a standard set of off-the-shelf soft contact lenses that are mass-produced by a manufacturer. This baseline lens (e.g., predicate or trial contact lens) is identified with standard clinical practices to meet the overall fit, ocular health, and visual needs of the patient;
  Step 12: determining if the trial contact lens is rotationally and translationally suitable (i.e., stable enough) before proceeding to the next step;
  Step 14: measuring, with a wavefront sensor in a wavefront aberrometer, the residual uncorrected sphere, cylinder, and higher order aberrations (HOAs) through an off-the-shelf, soft contact lens that is fitted on the eye;
  Step 16: defining a wavefront-customized contact lens front and/or rear surface profile that when implemented in a lens would correct for the residual aberrations measured in step 14;
  Step 18: integrating the wavefront-customized front surface profile from step 16 into a surface definition of the baseline (trial) soft contact lens used in step 10, thereby defining an integrated, wavefront-customized version of the off-the-shelf, soft contact lens that meets the optical needs of the patient's eye;
  Step 20: producing a wavefront-customized mold (or set of molds) with a diamond turned lathe, or by 3-D printing, based on the integrated design generated in step 18; and
  Step 22: using the wavefront-customized mold from step 20 in a soft contact lens molding process (that is typically used by the manufacturer) to make a wavefront-customized contact lens.

Regarding step 18, the real "optical action" takes place at the first (front) surface of the contact lens, given a large difference in refractive index between the contact lens and surrounding media. Customizing the rear surface of the contact lens is primarily done to stabilize the contact lens on the eye, and to correct for residual cylinder errors. The shape of a patient's cornea and sclera can be measured by a number of different techniques, including: corneal topography, profilometry, Scheimflug, and Optical Coherence Tomography (OCT).

Figure 3:
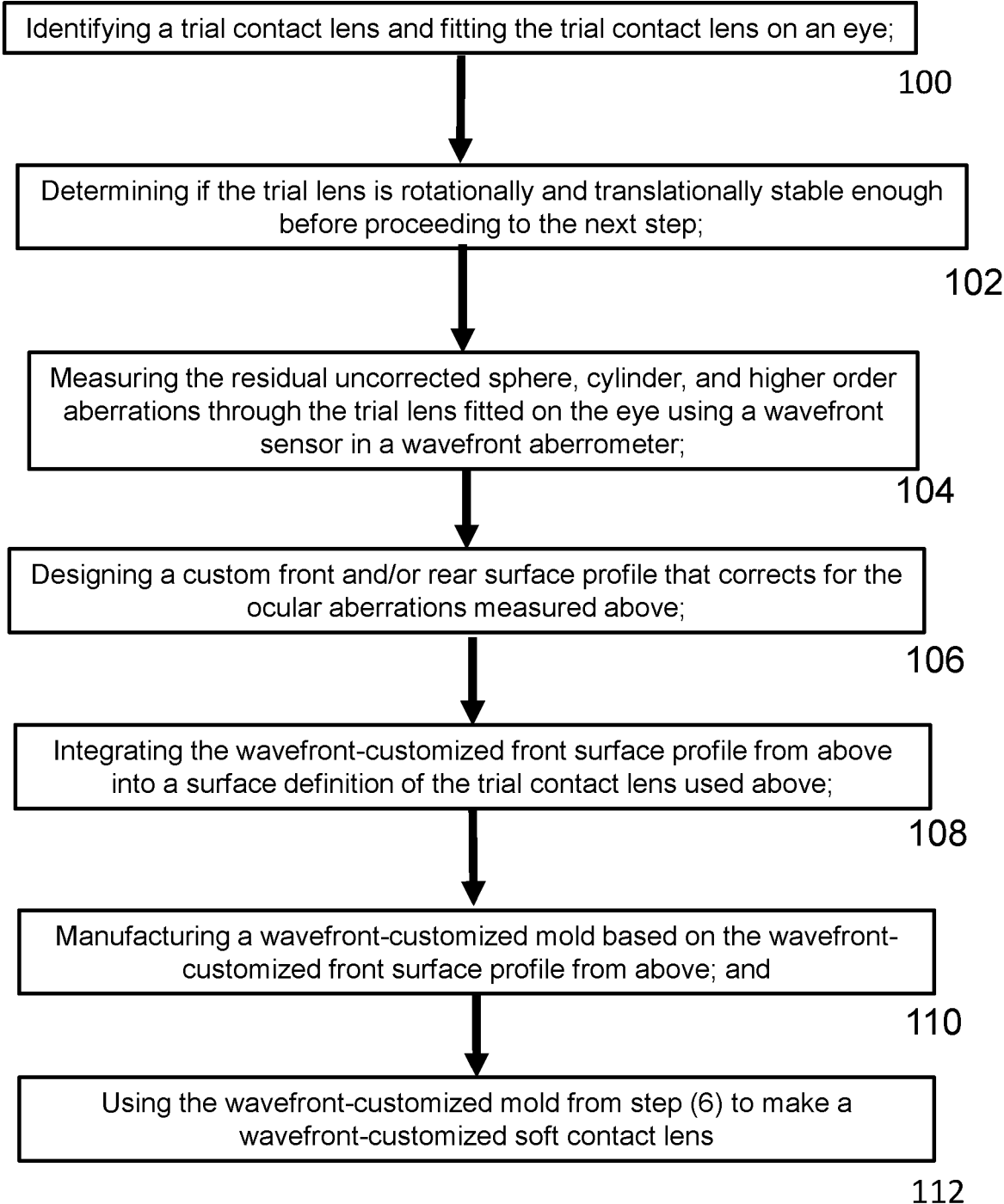
FIG. 3 shows a third embodiment illustrating an example of a process flow chart for manufacturing one or more contact lenses via cast or injection molding using a wavefront-customized mold, according to the present disclosure.

FIG. 3 shows a third embodiment illustrating an example of a method of making a customized contact lens, comprising performing the following steps:
  Step 100: Identifying a trial contact lens and fitting contact lens on an eye; Step 102: determining if the trial lens is rotationally and translationally stable enough before proceeding to the next step;
  Step 104: measuring the residual uncorrected sphere, cylinder, and higher order aberrations through the trial lens fitted on the eye using a wavefront sensor in a wavefront aberrometer;
  Step 106: designing a custom front and/or rear surface profile that corrects for the ocular aberrations measured above;
  Step 108: integrating the wavefront-customized front surface profile from above into a surface definition of the trial contact lens used above;
  Step 110: producing a wavefront-customized mold based on the integrated design from above; and
  Step 112: using the customized mold from above in a soft contact lens molding process to make a customized soft contact lens.

Figure 4:
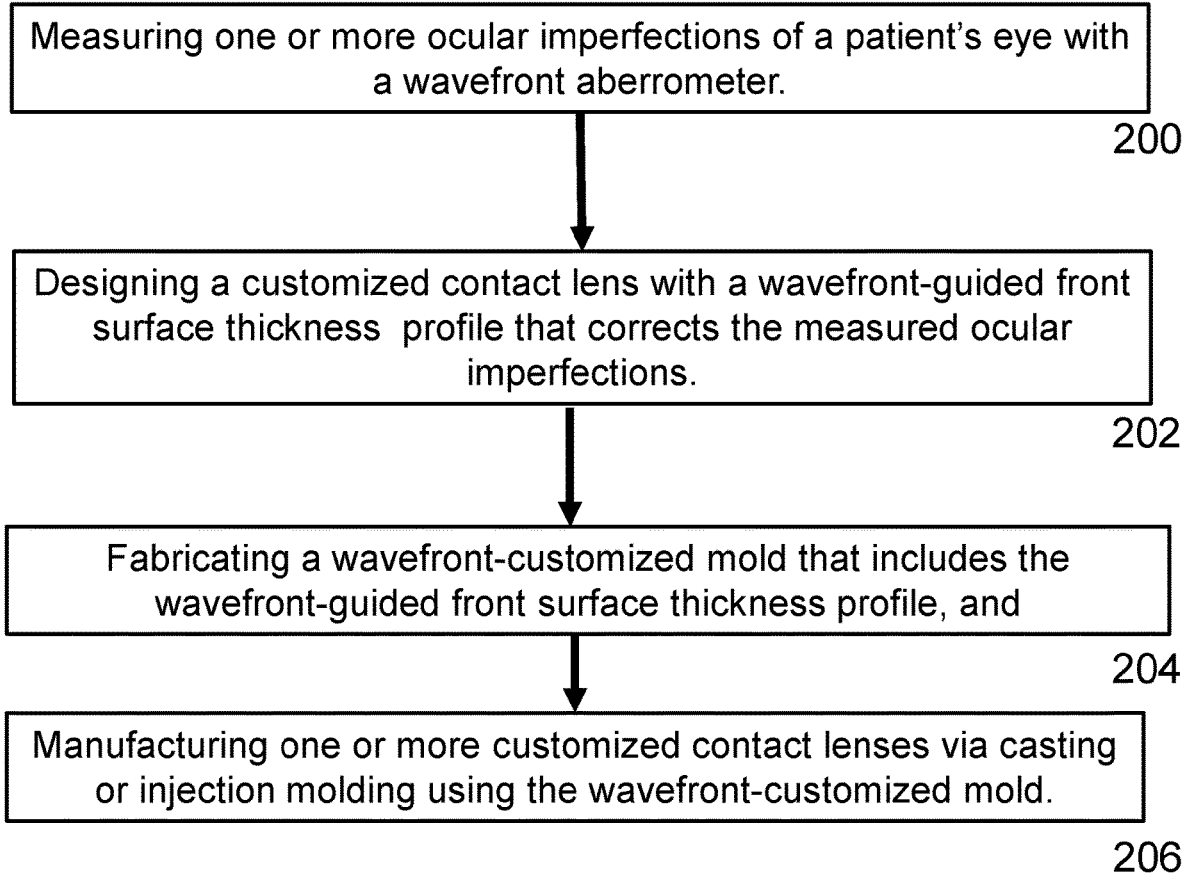
FIG. 4 shows a fourth embodiment illustrating an example of a process flow chart for manufacturing one or more contact lenses via cast or injection molding using a wavefront-customized mold, according to the present disclosure.

FIG. 4 shows a fourth embodiment illustrating an example of method of making a customized contact lens, comprising performing the following steps:
  Step 200: Measuring one or more ocular imperfections of a patient's eye with a wavefront aberrometer;
  Step 202: Designing a contact lens with a front surface profile that corrects for these ocular imperfections;
  Step 204: Fabricating a wavefront-customized contact lens mold that includes the wavefront customized front surface profile; and
  Step 206: Manufacturing one or more contact lenses via cast or injection molding using said wavefront-customized mold.

Figure 5:
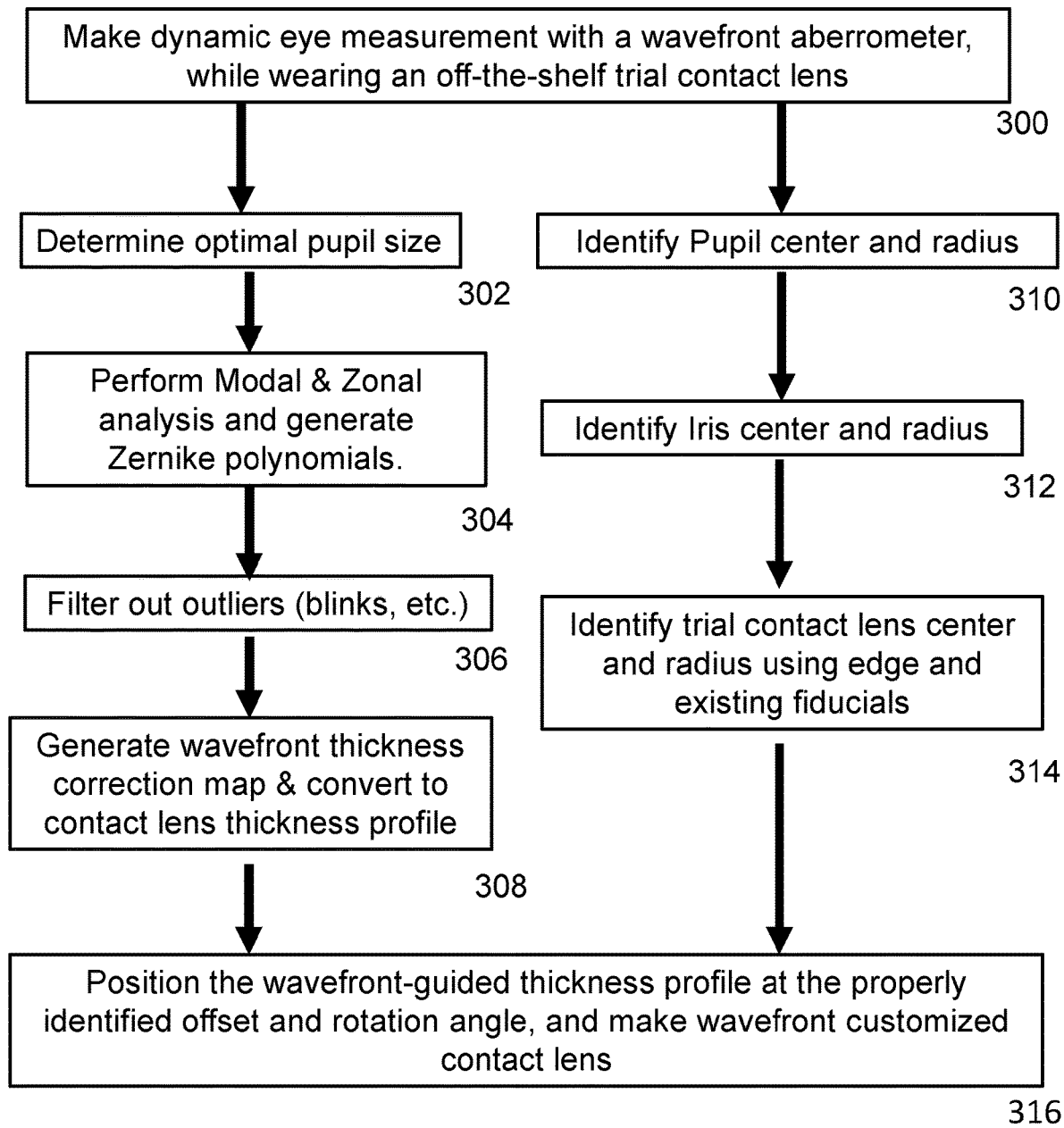
FIG. 5 shows a fifth embodiment illustrating an example of a process flow chart for manufacturing one or more contact lenses via cast or injection molding using a wavefront-customized mold, according to the present disclosure.

FIG. 5 shows a fifth embodiment illustrating an example of method of making a customized contact lens, comprising performing the following steps:
  Step 300: Make dynamic eye measurement with a wavefront aberrometer while wearing an off-the-shelf trial contact lens;
  Step 302: Determine optimal pupil size;
  Step 304: Perform Modal & Zonal methods to generate Zernike polynomials;
  Step 306: Filter outliers (e.g., blinks, etc.);
  Step 308: Generate wavefront-customized thickness correction map & convert to contact lens thickness profile;
  Step 310: Identify Pupil center and radius;
  Step 312: Identify Iris center and radius;
  Step 314: Identify trial contact lens center and radius using edge and existing fiducials; and
  Step 316: Position the wavefront-guided front thickness profile to the properly identified offset and rotation angle, and then make a wavefront-customized contact lens.

Figure 6:
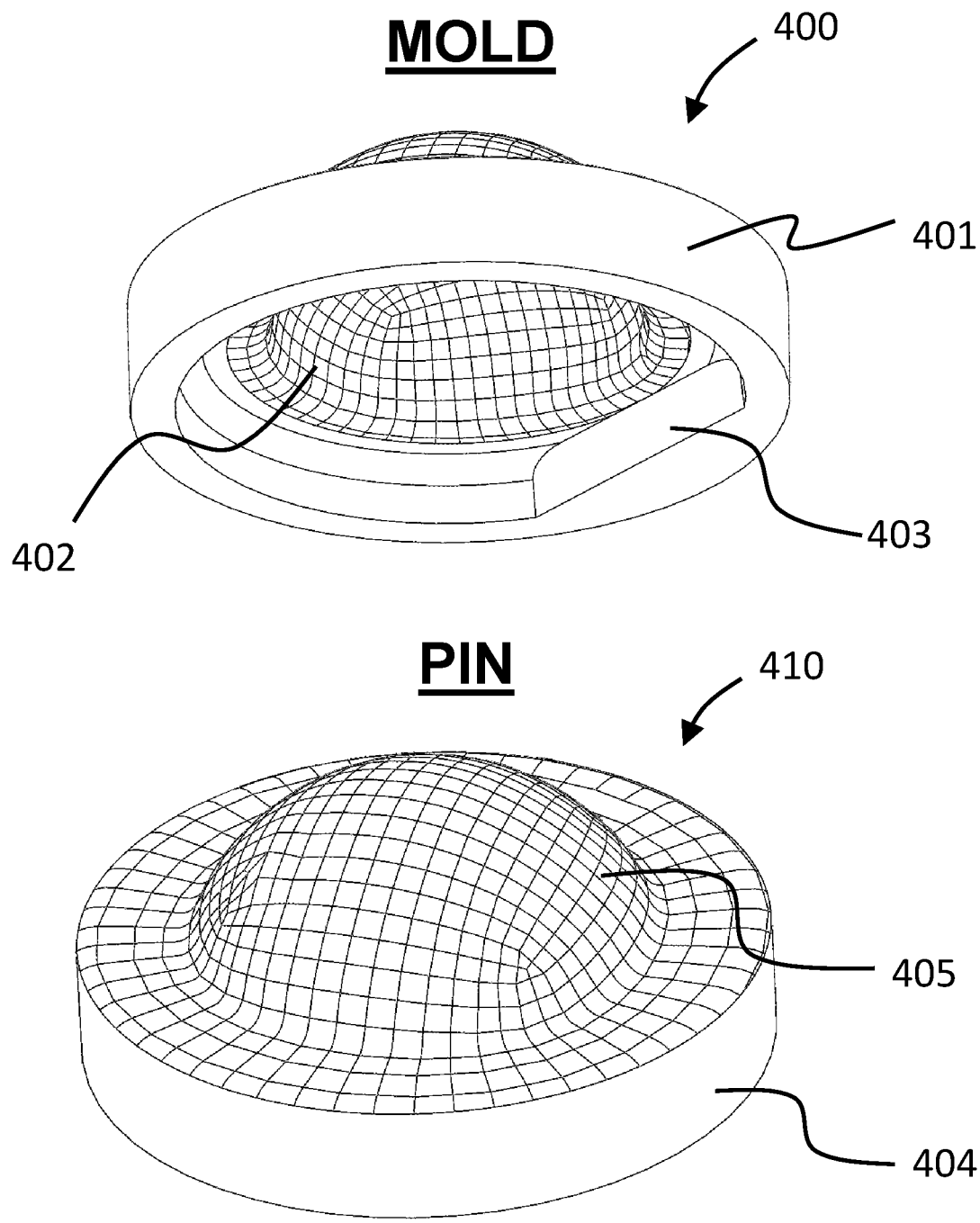
FIG. 6 shows a perspective view of an example of a wavefront-customized mold and wavefront-customized pin for making a wavefront-customized contact lens, according to the present disclosure.

FIG. 6 shows an example of a wavefront-customized mold 400 and wavefront-customized pin 410 for making a wavefront-customized contact lens. Contact lenses have a front surface and a back surface, which may have different shapes. The wavefront-customized mold 400 comprises a support ring 401 (which may be, for example, a circular ring) with a curved, dome-shaped, interior shape 402 that defines and molds an anterior (front) surface 402 of the wavefront-customized contact lens (not shown). In some embodiments, mold 400 has an alignment feature 403 to facilitate accurate rotational alignment to pin 404. Customized pin 410 comprises a circular support ring 404 (which may be, for example, a circular ring) with a curved, dome-shaped, exterior surface 405 that defines and molds a posterior (back) surface of the wavefront-customized contact lens. To manufacture a wavefront-customized contact lens, mold 400 is usually inverted and filled with the contact lens material in liquid form. This may be chosen from any number of materials including: etafilcon, polymacon, hioxifilcon, or tetrafilcon, or other contact lens materials, or combinations thereof. Mold 400 and pin 410 are partially-assembled during manufacturing and then the liquid contact lens material is placed in mold 400. Mold 400 and pin 410 are then assembled together such that the space between these two molds is completely filled with the liquid lens material. A final curing step results in solidifying the liquid contact lens material. This curing step may be done thermally or with UV curing, or both. Customizing the rear surface of the contact lens is primarily done to stabilize the contact lens on the eye, and to correct for residual cylinder errors. The shape of a patient's cornea and sclera can be measured by a number of different techniques, including: corneal topography, profilometry, Scheimflug, and Optical Coherence Tomagraphy (OCT). In some embodiments, pin 410 may have a wavefront-customized shape.

The methods and systems described herein have several useful features. It ties in with mass manufacturing molded lens technology to provide for highly repeatable, comfortable contact lenses. It also facilitates the manufacture, at very low cost, of many contacts lenses from a single mold. Thus, a year's supply (365+ days) of contacts can be made from a single production run. A fully-customized lens that is wavefront corrected can be made from a daily wear contact lens. This has advantages for the patient in that (1) these lenses will be less prone to infection and debris, (2) they do not require any cleaning, and (3) it simplifies patient compliance. The manufacture of molds (including pins) can be separated from the manufacture of wavefront-customized contact lens. This allows the designer that designs the wavefront-customized contact lens mold to be physically separated from the lens manufacturer.

In some embodiments of a manufacturing system 1, the mold design is based on an existing mold design. In other embodiments of a manufacturing system 1, one element in a mold set is a wavefront-customized element, where the other mold set elements are selected from a standardized stock.

In some embodiments, the method of manufacture can comprise a hybrid approach where the back surface of a wavefront-customized contact lens is molded using casting or injection molding, and the front surface of the wavefront-customized contact lens is turned on a diamond-tipped, computer-controlled lathe with fast Z-axis capability, or formed by 3-D printing.

What is claimed is:

1. A method of manufacturing a wavefront-customized contact lens, comprising:
   (1) measuring one or more ocular imperfections of a patient's eye with a wavefront aberrometer;
   (2) designing a wavefront-customized contact lens comprising a wavefront-guided front surface thickness profile that corrects the one or more ocular imperfections;
   (3) fabricating a wavefront-customized mold that includes the wavefront-guided front surface thickness profile; and
   (4) manufacturing one or more wavefront-customized contact lenses via casting or injection molding using the wavefront-customized mold; and
   wherein the wavefront-customized mold design and the wavefront-customized contact lens manufacturing are uniquely customized for the patient's eye;
       wherein the wavefront-customized contact lens has a front surface and an opposing back surface;
       wherein the opposing back surface is molded using casting or injection molding; and
       wherein the front surface is made by (1) turning on a diamond-tipped, computer controlled lathe with a fast Z-axis capability, or by (2) 3D printing, or combinations thereof.

2. A method for manufacturing a wavefront-customized contact lens, comprising:
   (1) identifying a trial contact lens and fitting the trial contact lens on a patient's eye;
   (2) determining if the trial contact lens is suitable for use;
   (3) measuring one or more ocular aberrations of the patient's eye through the trial contact lens with a wavefront aberrometer;
   (4) designing a wavefront-customized front surface thickness profile, based on the one or more ocular aberrations measured in step (3);
   (5) integrating the wavefront-customized front surface thickness profile from step (4) into a front surface definition of the trial contact lens;
   (6) manufacturing a wavefront-customized mold based on the wavefront-customized front surface thickness profile from step (5); and
   (7) manufacturing a wavefront-customized contact lens using the wavefront-customized mold made in step (6).

3. The method of claim 2, wherein step (4) further comprises designing a customized rear surface profile.

4. A method for manufacturing a wavefront-customized contact lens, comprising:
   (1) providing a trial contact lens to a patient;
   (2) making dynamic eye measurements of one or more ocular imperfections of a patient's eye with a wavefront aberrometer while wearing a trial contact lens;
   (3) identifying a pupil center and a pupil radius of the patient's pupil;
   (4) identifying an iris center and an iris radius of the patient's iris;
   (5) identifying a trial center, a trial radius, a trial offset, and a trial rotation angle of the trial contact lens;
   (6) determining an optimal pupil size;
   (7) performing Modal and Zonal analysis of the one or more ocular imperfections, and generating Zernike polynomials;
   (8) filtering out outliers and blinks;
   (9) generating a wavefront-customized front thickness correction map;
   (10) converting the wavefront-customized thickness correction map into a wavefront-customized contact lens front thickness profile;
   (11) positioning the wavefront-customized contact lens front thickness profile at the trial offset and the trial rotation angle identified in step (5), and
   (12) manufacturing a wavefront-customized contact lens.

5. The method of claim 4, wherein step (1) further comprises measuring a refraction and one or more higher-order ocular aberrations of the patient's eye with a trial lens fitted on the patient's eye.

* * * * *